Patented May 19, 1953

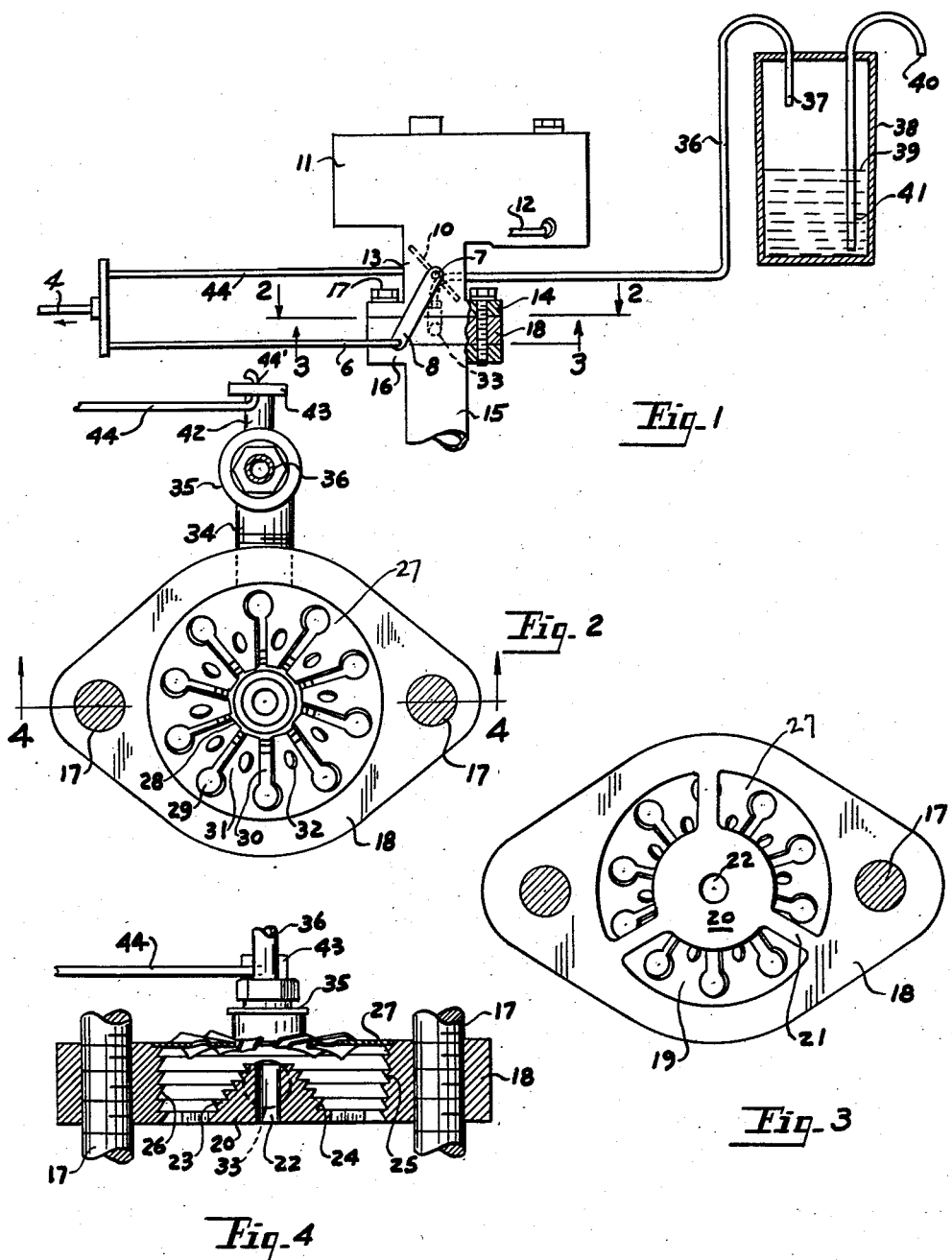

2,639,230

UNITED STATES PATENT OFFICE 2,639,230

FUEL AND AIR MIXER FOR USE IN CONJUNCTION WITH A CARBURETOR

Maurice Lefebre, Detroit, Mich.

Application August 25, 1950, Serial No. 181,519

3 Claims. (Cl. 48—180)

This invention relates to a fuel and air mixer construction for use in conjunction with the carburetor of an internal combustion engine and is adapted to be interposed in the fuel delivery conduit intermediate the carburetor and the fuel intake manifold.

It is the object of the present invention to provide a very simplified fuel mixing device which is interposed in the fuel line to the intake manifold of the vehicle and which is adapted to assure a more complete mixture of air and gasoline vapor.

It is the further object of this invention to provide a simplified mechanism which is fully effective for the intended purpose and which will increase the efficiency of the engine and permit more miles of travel per gallon of gasoline.

These and other objects will be seen from the following specification and claims in conjunction with the appended drawing in which—

Fig. 1 is an elevational view partially broken away in section illustrating applicant's fuel mixer interposed in the fuel delivery pipe from the vehicle carburetor.

Fig. 2 is a section on line 2—2 of Fig. 1.

Fig. 3 is a section on line 3—3 of Fig. 1; and

Fig. 4 is a section on line 4—4 of Fig. 2.

It will be understood that the above drawing illustrates merely a preferred embodiment of the invention, and that other embodiments are contemplated within the scope of the claims hereafter set out.

Referring to the drawing there is shown in Fig. 1 diagrammatically the carburetor 11 with gasoline or fuel supply pipe 12 connected therewith and with an outlet pipe 13 depending from the carburetor and having an annular flange 14. Said outlet pipe 13 from the carburetor has an extension 15 which leads to the vehicle engine fuel intake manifold, not shown, and which has an annular flange 16 for connection with the corresponding flange 14.

The present fuel and air mixer includes the cylindrically shaped block or housing 18 which is positioned between the flanges 14 and 16 and secured with respect thereto by the bolts 17, the said block having a central aperture to permit the flow of the fuel mixture therethrough from carburetor outlet pipe 13 to its extension pipe 15. The aforesaid aperture 19 has an inlet opening at its upper end and a corresponding outlet opening at its lower end to permit the passage of the mixed fuel therethrough.

As shown in Figs. 3 and 4 there is provided at the outlet opening of aperture 19 a cone shaped baffle 20 which forms an integral part of the cast body 18 and which extends upwardly thereinto, said baffle being connected to lower portions of said body by the radially spaced integral arms 21 as shown in Fig. 3.

Baffle 20 has a central discharge opening 22 and has formed in its exterior surface a series of longitudinally spaced annular flanges 23 having angularly and upwardly inclined wall portions 24 which extend in the direction of the inlet of aperture 19. It will be noted that starting with the upper end of baffle 20 the flanges 23 are of increasing diameter and are adapted to obstruct the flow of the mixed fuel as it passes through the block 18 to thereby additionally create such turbulent condition to the mixture as to assure a complete mixing thereof.

There are also formed within the interior surface of the block 18 adjacent its aperture 19 a second series of longitudinally spaced annular inwardly projecting flanges 25 which have annular upwardly extending wall portions 26, also extending in the direction of the inlet opening at the upper end of aperture 19.

Circular transversely arranged apertured plate 27 is arranged within a corresponding annular opening in the body 18 at its inlet end and is suitably secured in position. Said plate has a central opening 28 and a series of circumferentially spaced openings 29 adjacent its periphery and with the openings 29 being respectively joined to said central opening by a series of radial slots 30.

There is thus defined between slots 30 a plurality of spaced circularly arranged wedge shaped surfaces 31 which are formed or turned at an acute angle to a plane passing through the body of plate 27 to thereby define a plurality of annularly inclined radially spaced fuel mixture obstructing surfaces 31. There are also formed within the inclined surfaces 31 the circular openings 32 as shown in Figs. 2 and 3 through which the fuel mixture may pass.

Thus the plate 27 has apertures 29 and 32; the radial slots 30 as well as the central opening 28 through which the fuel mixture from the carburetor is forced to pass, with the remainder of the plate 27 obstructing the normal flow of the fuel mixture from the carburetor and creating a turbulent condition thereof to obtain a more homogenous mixture. The mixed fuel then passes through the central aperture 19 and is frictionally engaged by the angular upwardly inclined annular flanges 23 and 25 to further complete the mixing of the fuel after which the same passes through the outlet at the lower end of the chamber 19 and down through the delivery pipe 15 shown in Fig. 1.

The transverse lateral opening 33 is formed within the block 18 and at its inner end communicates with the interior of the aperture 19 thereof. The fitting 34 is threaded into the outer portion of passage 33 and includes a valve 35 which is connected to one end of the flexible water vapor pipe 36, there being a suitable rotatable valve element 42 which projects outwardly from the valve housing 35 and which is operated by the upright arm 43.

Longitudinally reciprocal control rod 44 is joined at 44' to the upper end of the valve controlling arm 43 to thereby control the flow of water vapor through pipe 36. The opposite end of pipe 36 has a downwardly extending portion 37 which projects into the air space of closed container 38 with water 39 in the lower portion thereof. Air inlet pipe 40 extends through the upper wall of container 38 and has an elongated tubular portion 41 which projects down into the fluid adjacent the bottom of the container whereby in operation of the carburetor and fuel mixing device water vapor will be drawn into the central aperture 19 of the block 18 for mixture with the fuel supply to the vehicle engine.

It has been found that the application of water vapor to the fuel mixture improves the efficiency of the explosive mixture whereby additional power is obtained.

Fuel control arm 8 is pivoted at 7 upon the exterior of the outlet pipe 13 of carburetor 11 with the pivotal shaft extending into the pipe 13 and carrying thereon the rockable butterfly 10 or control for regulating the amount of fuel mixture delivered through the pipes 13 and 15. Control rod 6 is joined at one end to the lower end of the arm 8 and the opposite end thereof is secured to the bracket 5 shown in Fig. 1. Similarly the outer end of the moisture control rod 44 is also connected to the bracket 5. Furthermore the bracket 5 is interconnected with the vehicle accelerator pedal not shown by the single reciprocal rod 4.

By this construction the rod 4 operated by the accelerator pedal controls the amount of fuel which flows past the valve 10 in carburetor outlet pipe 13 and at the same time controls the amount of water vapor which flows through the pipe 36 from the fluid container 38.

Having described my invention reference should now be had to the claims which follow for determining the scope thereof.

I claim:

1. A fuel and air mixer adapted for use in conjunction with the carburetor of an internal combustion engine comprising a centrally apertured block having inlet and outlet openings, said block having formed along its interior surface a plurality of annular longitudinally spaced upwardly inclined flanges extending toward said inlet opening, a central cone shaped baffle within said block positioned centrally of its outlet opening and secured thereto and having a plurality of longitudinally spaced outwardly inclined annular flanges of decreasing diameter extending toward said inlet opening, and a transverse apertured plate secured within said inlet opening spaced from said baffle and having formed therein a plurality of apertured angularly inclined radially spaced fuel mixture obstructing surfaces.

2. A fuel and air mixer adapted for use in conjunction with the carburetor of an internal combustion engine comprising a centrally apertured block having inlet and outlet openings, said block having formed along its interior surface a plurality of annular longitudinally spaced upwardly inclined flanges extending toward said inlet opening, a central cone shaped baffle within said block positioned centrally of its outlet opening and secured thereto and having a plurality of longitudinally spaced outwardly inclined annular flanges of decreasing diameter extending toward said inlet opening, and a transverse apertured plate secured within said inlet opening spaced from said baffle and having radial slots opening to a central aperture and providing angularly inclined apertured fuel mixture obstructing surfaces intermediate said slots.

3. A fuel and air mixer adapted for use in conjunction with the carburetor of an internal combustion engine comprising a centrally apertured block having inlet and outlet openings, said block having formed along its interior surface a plurality of annular longitudinally spaced upwardly inclined flanges extending toward said inlet opening, a central cone shaped baffle within said block positioned centrally of its outlet opening and secured thereto and having a plurality of longitudinally spaced outwardly inclined annular flanges of decreasing diameter extending toward said inlet opening, and a transverse plate secured within said inlet opening and having formed therein a plurality of circumferentially spaced openings and radial slots extending inwardly of said openings to a common central aperture, the portions of said plate between said slots being apertured and bent at an acute angle to the plane of said plate.

MAURICE LEFEBRE.

References Cited in the file of this patent

UNITED STATES PATENTS

| Number | Name | Date |
|---|---|---|
| 1,535,702 | Walsh et al. | Apr. 28, 1925 |
| 1,974,865 | Goldoft et al. | Sept. 25, 1934 |
| 2,028,937 | Lefebre | Jan. 28, 1936 |

FOREIGN PATENTS

| Number | Country | Date |
|---|---|---|
| 755,191 | France | Sept. 4, 1933 |